May 24, 1960 A. WEISENFELD 2,937,446
DENTAL TOOL AND MASSES HELD THEREIN
Filed April 6, 1956
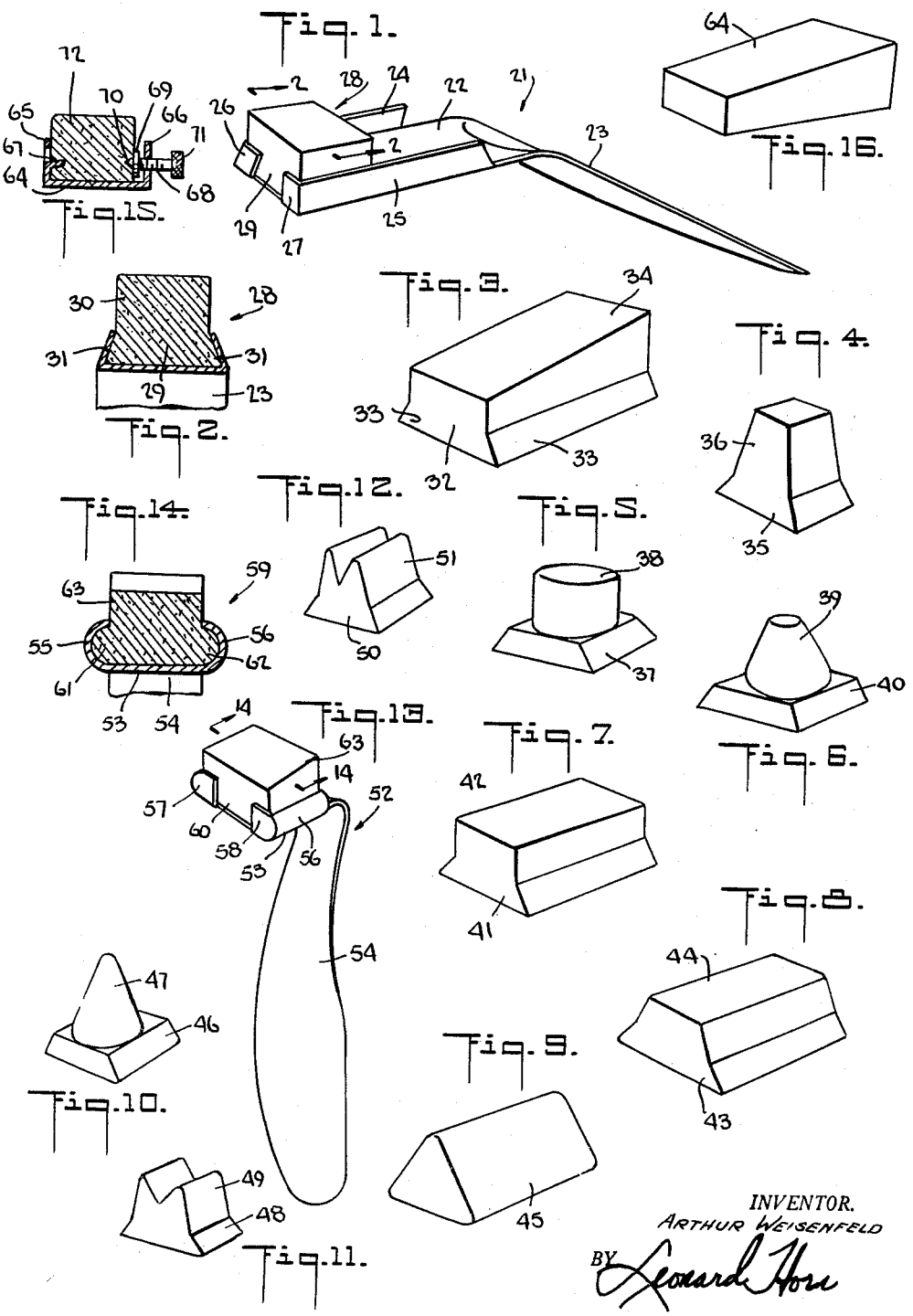
INVENTOR.
ARTHUR WEISENFELD
BY Leonard Horn
ATTORNEY

United States Patent Office 2,937,446
Patented May 24, 1960

2,937,446

DENTAL TOOL AND MASSES HELD THEREIN

Arthur Weisenfeld, 230–39 53rd Ave., Bayside 64, N.Y.

Filed Apr. 6, 1956, Ser. No. 576,723

12 Claims. (Cl. 32—40)

The present invention relates to a novel dental tool and to masses capable of being held by the tool in suitable manner for safely removing inlays, crowns, jackets, bridges and other dental parts during fitting, seating and adjusting prior to cementing of the dental part in place. More particularly, it relates to plastic masses in a variety of shapes, which masses when bitten into are tacky and adhesive but which may be readily and safely removed from the dental part to which they adhere. In addition, the invention relates to a tool which may retain such a mass so that the latter may readily be positioned at the appropriate location within a patient's mouth.

In making dental restorations of the nature of crowns, bridges, jackets, inlays, and the like, it is customary for the dentist to check the fit of the restoration prior to finally cementing it in place. This is done by positioning the restoration at the appropriate site within the patient's mouth. If the fit is comfortable and proper, it is necessary to remove the dental restoration without marring, distorting or damaging same, so that cement may be applied to the adjacent surface and the restoration replaced.

If the fit is not correct then the restoration must be withdrawn from the patient's mouth and re-worked, after which a trial fit is again necessary with subsequent removal prior to application of cement. In either event, however, it can be seen that the restoration must be withdrawn after fitting. The conventional manner of removing the restoration involves the use of instruments. Such tools tend to scratch, mar or break the surface and margins of the fitting and where the restoration is extremely tight or exceedingly thin and delicate, the tools may even serve to distort the restoration so that even if a proper fitting was achieved before cementing, the dental restoration after cementing is no longer exact, with resulting discomfort to the patient.

It is accordingly an object of the present invention to provide a novel tool and dental mass which may be employed successfully in the fitting of dental restorations without fear of damage to the restoration.

Yet another object of the present invention is to provide a mass of adhering character which may be softened and/or dissolved in easy manner.

It is a further object of the invention to provide a plastic mass of suitable shape so that when bitten into, it will adhere tenaciously to the adjacent dental item or part, taking such dental item or part therewith if the latter is not firmly secured in the patient's mouth.

Another object of the invention is to provide plastic masses of the character described which will span either one or several teeth so that they may operate upon dental items or parts of varying lengths and shapes.

Still another object of the invention is to provide a novel dental tool which may be inserted into a patient's mouth to serve as a biting abutment when a suitable plastic mass is held by the tool.

Yet another object of the invention is to provide a novel dental tool having means permitting the ready insertion and withdrawal of plastic masses of the character described.

These and other objects and advantages are realized by the present invention which will be described in detail with reference to the accompanying drawing, wherein:

Fig. 1 is a perspective view of a novel dental tool holding a novel mass in accordance with the present invention;

Fig. 2 is a vertical section of the tool and mass taken along line 2—2 of Fig. 1;

Fig. 3 is a perspective view of a differently shaped mass for receipt in the tool of Fig. 1;

Figs. 4 through 12, inclusive, are perspective views of still differently shaped masses which can be used in conjunction with the novel tool of Fig. 1;

Fig. 13 is a perspective view of a modified dental tool holding a mass of corresponding shape;

Fig. 14 is a sectional view along line 14—14 of Fig. 13;

Fig. 15 is a vertical section through a further modification of a tool in accordance with the present invention; and Fig. 16 is a perspective view of the mass in Fig. 15.

Referring now more particularly to the drawing, in Fig. 1 there is shown a dental tool 21 composed of a substantially flat base 22 and a handle 23 connected at an angle with the base 22. At the sides of the base there are provided a pair of walls 24, 25, which extend longitudinally of the base and are canted or tilted toward each other as they rise from the base. In this manner the walls 24, 25, form a keyway or undercut passageway which extends longitudinally of the base.

The far end of the base 22 remote from the handle 23 carries a pair of spaced end abutments 26, 27 each of which extends vertically and is connected with a respective one of the side walls 24, 25.

As can be seen more clearly in Fig. 2, a dental mass 28 is provided with a foot portion 29 and an upper portion 30. The foot portion 29 includes a pair of lateral projections 31 which are upwardly converging so that the foot portion conforms to the keyway defined by base 22 and walls 24, 25 of the tool 21. The dental mass 28 is thus held firmly against lateral displacement, although it is capable of longitudinal displacement within the keyway. Such longitudinal displacement is limited at one end by end abutments 26, 27 whereas the other end of the keyway is open to permit removal and insertion of the dental mass.

To facilitate such removal, the end abutments 26, 27 are spaced from each other so that an instrument such as dental pliers may be employed to push the mass rearwardly within the keyway toward the open end. When the tool and mass are used as hereinafter explained, the mass will become tightened within the keyway and will not slide readily. Since it is not desirable to exert a force against the upper portion 30 of the mass 28, and since certain masses may not be suitably shaped at their upper portions for being removed, the spacing of the end abutments is of considerable assistance.

In use, the mass is placed in the tool when the patient has the dental restoration fitted in place but not yet cemented. The unit of the tool 21 and the mass 28 is placed in the patient's mouth with the upper portion 30 resting on the restoration. The patient then bites into the mass, or the tool with the mass is pressed onto the restoration, the base 22 serving as an opposite biting surface in the event that the patient has no teeth opposite the restoration. Because of the composition of the mass 28, the restoration becomes embedded in the mass and upon removing the tool from the patient's mouth the mass and restoration are also removed.

By pushing against the foot portion 29 of the dental mass in the space between end abutments 26 and 27, the mass is withdrawn from the keyway, carrying the restoration therewith. The mass and restoration are then either heated or left in water and the character of the mass is such that this treatment either wholly dissolves the mass or softens it sufficiently so that the restoration can be easily freed.

The restoration has thus been fitted and can be removed without fear of breakage, damage or distortion regardless of the number of fittings required. Following removal of the restoration when it is determined that the fit is proper, cement is applied to the restoration and to the adjacent tooth surface and the restoration secured in conventional manner.

The dental mass shown in Figs. 1 and 2 has a flat upper portion 29 which is about the length of a single tooth, thus being especially adapted for the fitting of broad restorations for molars or the like. Differently shaped restorations will require the use of differently shaped masses as shown in Figs. 3 to 12.

The mass of Fig. 3 comprises an elongated foot portion 32 having lateral projections 33 adapted to fit in the keyway of the dental tool of Figs. 1 and 2. Integral with the foot portion 32 there is an upper portion 34 which is slightly tapered or inclined in vertical direction. The mass is thus suited for fitting of restorations extending the length of several teeth in the molar and bicuspid areas.

Fig. 4 shows a dental mass having a foot portion 35 connected with an upper portion 36 in the shape of an elongated trapezoid and thus suited for restorations which have a narrower biting surface.

In Fig. 5 there is shown a dental mass with a trapezoidal foot portion 37 and a cylindrical upper portion 38, which shape is adapted for use with restorations that are basically round or oval rather than square.

The frusto-conical upper portion 39 which is superposed on foot portion 40 in Fig. 6 is suited for smaller restorations, e.g., restorations covering only a portion of a tooth area.

In Figs. 7, 8 and 9, elongated dental masses are shown which are suited for restorations extending the length of several teeth. In Fig. 7 the foot portion 41 is surmounted by a parallelopiped upper portion 42 while in Fig. 8 the foot portion 43 is surmounted by an elongated trapezoidal upper portion 44. In Fig. 9 the dental mass 45 is formed in such manner that the foot and upper portions are integral and continuous, being shaped like an elongated triangle and suited for restorations wherein a relatively pointed dental mass is required.

The mass of Fig. 10 has a foot portion 46 surmounted by a conical upper portion 47 which is useful for fitting very small restorations.

Foot portion 48 carrying upper portion 49 as shown in Fig. 11 produces a dental mass which is suited for fitting caps for anterior teeth, which are pointed. The mass of Fig. 12 comprises foot portion 50 and upper portion 51, which is somewhat more deeply indented than upper portion 49 of Fig. 11, to conform with a different dental anatomy.

Fig. 13 shows a modified dental tool 52 having a flat base 53 connected at one end to a handle 54 which is curved to extend substantially perpendicular to the base 53, the tool 52 thus being adapted for frontal teeth wherein a vertical pull is desirable in removing the restoration.

A pair of side walls 55, 56 extends the length of the base and in vertical direction are concave with respect to each other, thereby forming a keyway or undercut for retention of a correspondingly shaped dental mass 59. As in the previous embodiment, a pair of end abutments 57, 58 is provided at the end of the base remote from the handle. These end abutments are spaced from each other to facilitate removal of the dental mass after use and they may be formed by bending up corresponding portions of the base or by bending in corresponding portions of the side walls. Alternatively, they may be separately joined to both the respective side wall and to the base.

As seen more clearly in Fig. 14, the dental mass 59 comprises a foot portion 60 having semi-cylindrical lateral projections 61, 62 corresponding to the keyway formed by the side walls 55, 56 of the tool. The upper portion 63 of the mass is shaped similarly to that shown in Fig. 3. The various shaped dental masses shown in Figs. 3 to 12 can be held in the dental tool of Fig. 13 if provided with the requisite shaped lateral projections.

Alternatively, a dental tool with a mass carrier as shown in Fig. 15 may be employed. A base member 64, provided with a handle (not shown), also carries a pair of upstanding walls 65, 66. At least one portion of wall 65 is struck in to form a tongue 67 while wall 66 is tapped to form a threaded passageway through which a screw 68 extends. The inner end of the screw is provided with a large flattened disc 69, carrying a point 70, the screw head 71 extending on the other side of wall 66.

In use, a dental mass 72 is placed between the walls 65, 66. As shown in Fig. 16 the mass 72 does not include a foot portion since it will be held in the tool by other means. The mass fits loosely between the walls and upon advancing screw 68 by means of screw head 71 disc 69 pushes the mass toward wall 65. The screw is tightened further so that tongue 67 and point 70 both dig into the mass 72 and thus retain the mass against falling out.

The novel tool may be formed by stamping or molding and may be composed of plastic or the like. Preferably, however, the tool is made of metal since it can readily be sterilized without fear of melting or becoming distorted.

The dental masses should be tacky when bitten into and should dissolve or soften in warm water, soap solution or oral liquids. An example of a suitable composition comprises approximately equal amounts of vegetable gums, corn syrup, starch and gelatin. Antiseptic or flavoring agents may also be incorporated into the composition from which the dental mass is formed by molding. In the cold or when stored under normal conditions in a room, the dental masses should be hard and non-adhesive for ease of handling, but when softened by heat and/or moisture they should become tacky and slightly resilient for proper adhesion to the restoration. In place of those masses set forth above, other plastic masses which soften upon heating or moistening may be similarly employed, e.g., plastics such as thermoplastics, carbohydrate derivatives, and the like.

Various changes and modifications may be made without departing from the spirit and scope of the present invention and it is intended that such obvious changes and modifications be embraced by the annexed claims.

I claim:

1. A dental tool comprising a substantially planar base having a pair of opposite ends and a pair of opposite sides, a pair of walls extending longitudinally of said sides and connected therewith, said walls being shaped in vertical direction so as to form an undercut keyway therebetween extending longitudinally of said base, a handle connected to said base and abutment means at but one end, said abutment means extending partially across the end and defining an end opening whereby an article inserted into said keyway through the unobstructed other end can be removed from said keyway by pushing with an implement inserted through the end opening defined by said abutment means.

2. A dental tool as defined in claim 1, wherein said handle extends at an angle relative to said base.

3. A dental tool as defined in claim 1, wherein the manipulating portion of said handle extends substantially perpendicularly to said base.

4. A dental tool as defined in claim 1, said abutment means including a pair of spaced abutments disposed adjacent said one end of said base and each near a respective one of said walls.

5. A dental tool as defined in claim 1, wherein said walls are each bowed outwardly in vertical section.

6. A dental tool as defined in claim 1, wherein said walls are canted toward each other so as to define an upwardly converging keyway.

7. In combination; a dental tool comprising a substantially planar base having a pair of opposite ends, a pair of walls extending longitudinally of said base and connected therewith, said walls being shaped in vertical direction so as to form an undercut keyway therebetween extending longitudinally of said base, abutment means disposed at one end of said base, said abutment means extending partially across the end leaving an end opening therein for insertion of an implement adapted to force the plastic mass hereinafter defined out of said keyway through the unobstructed opposite end and a handle connected to said base; and a shaped plastic mass, said mass including a foot portion conforming to said keyway and disposed therein to hold said mass to said base of said tool, and an upper portion integral with said foot portion and extending upwardly therefrom above said walls of said tool, whereby upon pressing or biting into said mass any uncemented or loose dental parts will become lodged in or adhere to said mass and will be removed together with the latter upon removing said tool by means of said handle.

8. The combination as defined in claim 7, said abutment means including a pair of spaced abutments disposed adjacent one end of said base of said tool, whereby said mass can be inserted into and removed from said keyway of said tool only at the other of said ends, said abutments preventing said mass from leaving said keyway at said one end during use.

9. A new article of manufacture comprising a shaped gelatinous mass having a pair of opposite ends and a pair of opposite sides and including a foot portion provided with a pair of laterally projecting elements at said sides, respectively, and an upper portion integral with said foot portion, the height of said upper portion increasing continuously from one of said ends to the other.

10. A new article of manufacture comprising a shaped plastic mass having a substantially rectangular top and bottom, a pair of substantially trapezoidal sides, and a pair of substantially rectangular ends, the height of said mass increasing continuously from one of said ends to the other.

11. A new article of manufacture comprising a shaped plastic mass including a foot portion provided with a pair of laterally projecting elements, and an upper portion integral with said foot portion, said upper portion being provided with a wedge-shaped notch extending longitudinally thereof.

12. A dental tool comprising a base, a handle operatively connected with said base for manipulating the latter, a pair of spaced upstanding walls connected with said base, tongue means on one of said walls extending toward the other wall, and advancing means on said other wall and mounted for displacement toward said one wall, whereby upon positioning a mass between said walls, operation of said advancing means pushes said mass until it is engaged and held by said tongue means.

References Cited in the file of this patent

UNITED STATES PATENTS

| | | |
|---|---|---|
| 2,237,926 | Cooley | Apr. 8, 1941 |
| 2,575,432 | Thompson | Nov. 20, 1951 |
| 2,645,013 | Mathison | July 14, 1953 |

FOREIGN PATENTS

| | | |
|---|---|---|
| 328,571 | Great Britain | Apr. 29, 1930 |
| 377,984 | Great Britain | Aug. 2, 1932 |